United States Patent [19]
Singh

[11] 4,279,438
[45] Jul. 21, 1981

[54] TIRE LOADER

[75] Inventor: Anand P. Singh, Youngstown, Ohio

[73] Assignee: NRM Corporation, Akron, Ohio

[21] Appl. No.: 95,586

[22] Filed: Nov. 19, 1979

Related U.S. Application Data

[63] Continuation of Ser. No. 872,421, Jan. 26, 1978, abandoned.

[51] Int. Cl.³ .......................... B29H 5/02; B66C 1/54
[52] U.S. Cl. ........................................ 294/88; 294/93; 425/38
[58] Field of Search .............. 294/67 R, 86.24, 93–97, 294/88; 74/586; 308/3 R; 414/910, 911; 425/36, 38

[56] References Cited

U.S. PATENT DOCUMENTS

| | | | |
|---|---|---|---|
| 141,191 | 7/1873 | Wilson | 74/586 X |
| 2,642,307 | 6/1953 | Olson | 294/67 R |
| 2,842,410 | 7/1958 | Neidhart | 308/3 R X |
| 2,923,569 | 2/1960 | Milliron | 294/97 |
| 3,380,115 | 4/1968 | Soderquist | 425/38 |
| 3,393,807 | 7/1968 | Sylvester et al. | 294/93 X |
| 3,471,895 | 10/1969 | Ulm et al. | 425/38 X |
| 3,564,649 | 2/1971 | Soderquist | 425/38 X |

FOREIGN PATENT DOCUMENTS

| | | | |
|---|---|---|---|
| 4624773 | 1/1968 | Japan | 425/38 |
| 1033497 | 6/1966 | United Kingdom | 294/93 |

Primary Examiner—Johnny D. Cherry
Attorney, Agent, or Firm—Maky, Renner, Otto & Boisselle

[57] ABSTRACT

A loader for tire machinery such as tire presses is disclosed, which loader is supported from a vertically and horizontally movable frame and which includes a vertical shaft or sleeve journaled with respect to the frame with a horizontal plate secured for rotation therewith. Loader shoes are mounted on the frame for radial movement and respective links interconnect the plate and each loader shoe, each link extending at a common angle with respect to a radius from the center of rotation of the plate, and rotation of the plate in one direction will reduce the angle accordingly moving the shoes radially outwardly and rotation of the plate in the opposite direction will increase the angle moving the shoes radially inwardly. Each link is adjustable in length and the extent of rotation of the plate in one or both directions is limited by adjustable stops. The loader shoes remain parallel throughout their movement and are supported for radial movement by self-aligning slider blocks.

17 Claims, 4 Drawing Figures

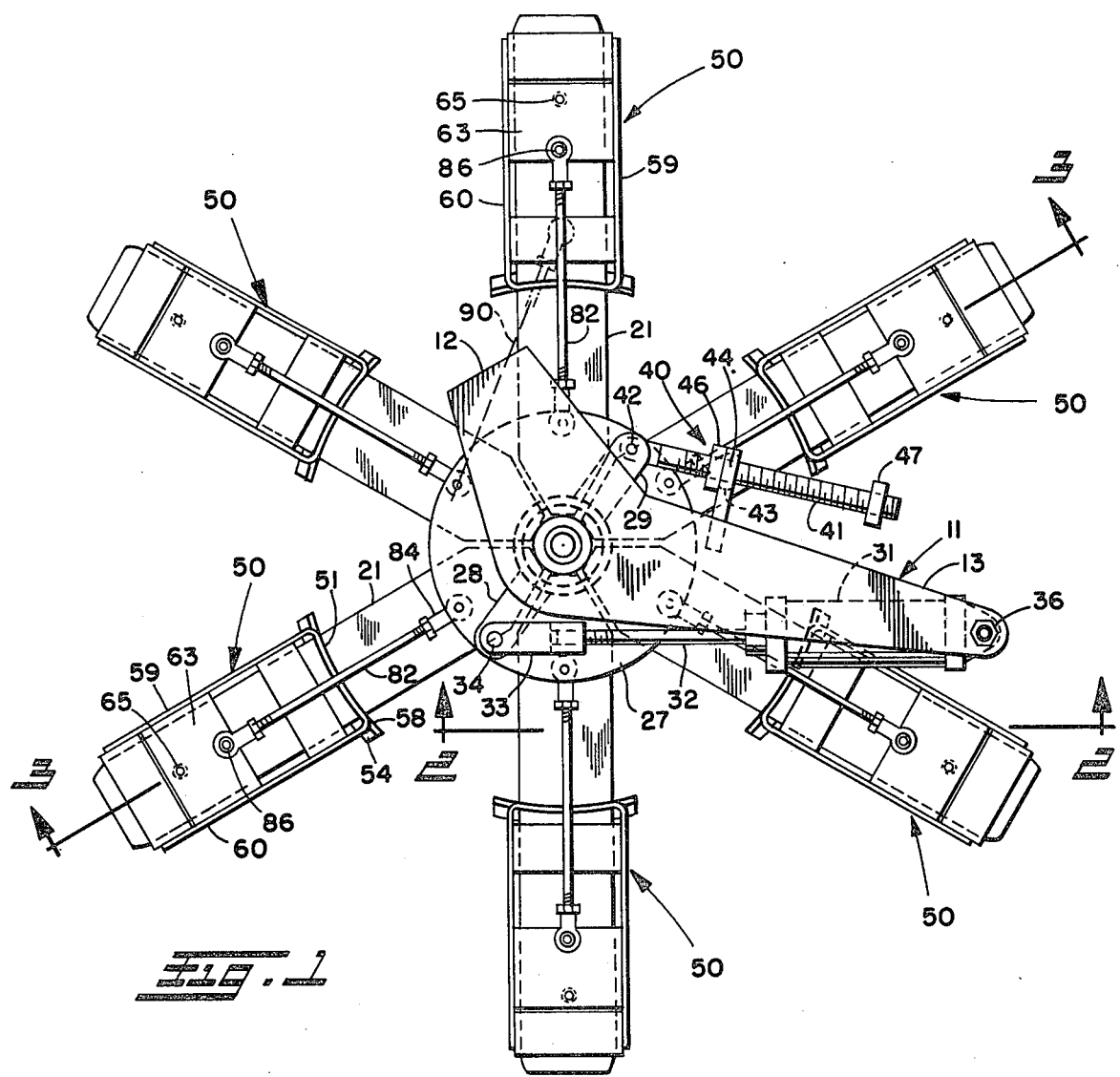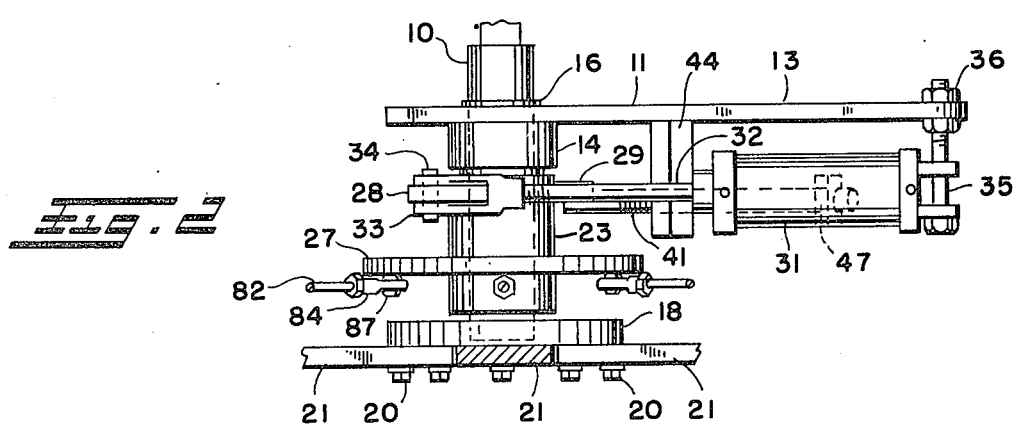

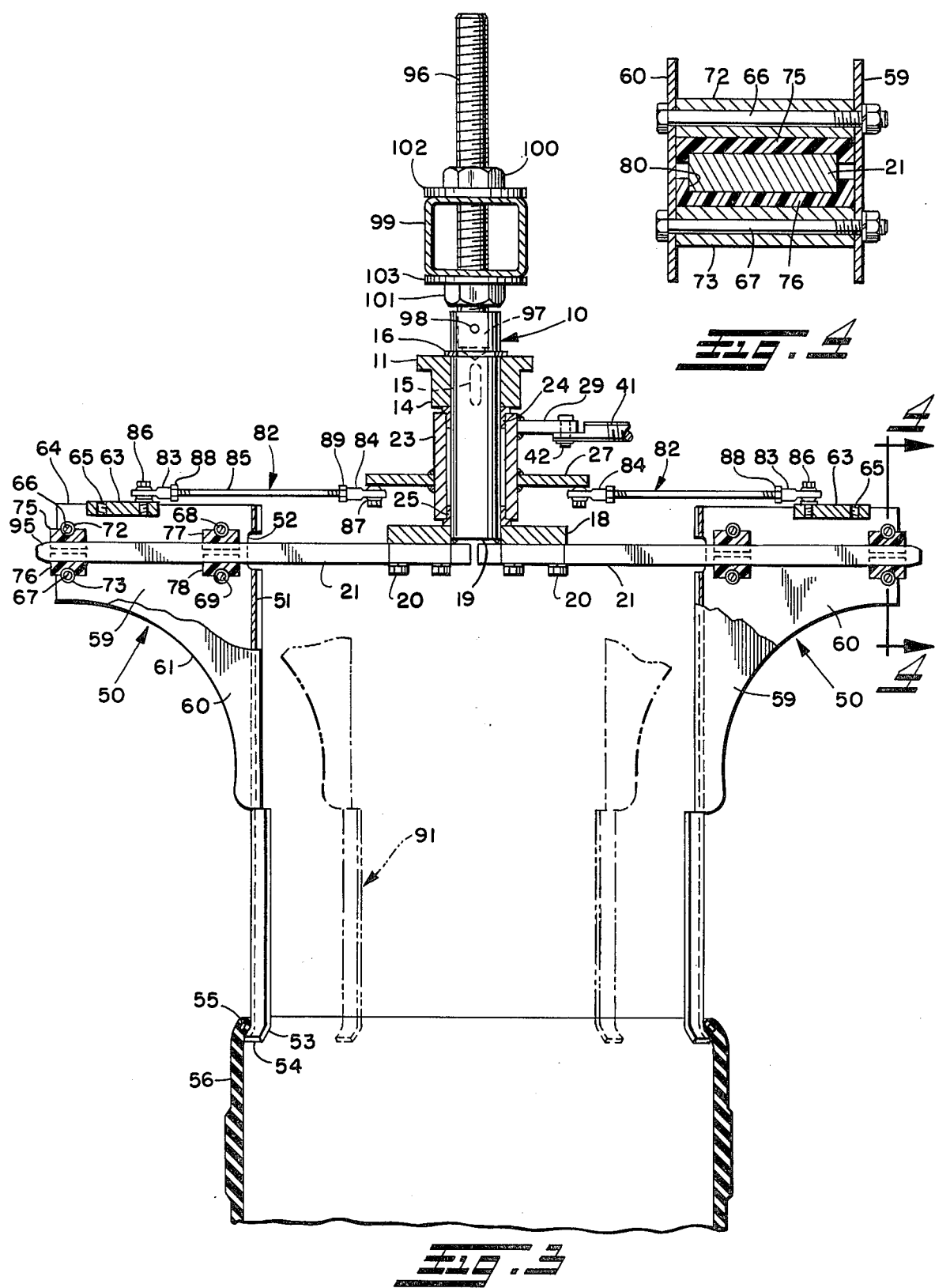

TIRE LOADER

This is a continuation of application Ser. No. 872,421, filed Jan. 26, 1978, now abandoned.

This invention relates generally as indicated to a tire loader and more particularly to a loader mechanism for use with tire machinery such as tire curing presses.

Tire loaders have been widely employed in connection with automated tire machinery such as tire curing presses. Most such tire loaders pick up the tire by the upper bead and the shoes of such loader exert a slight pressure on the interior of the upper bead which can cause bead distortion. Moreover, in some tire loaders such pressure is required for centering purposes, yet must be sufficiently light to permit the tire to slip down the loader shoes so that the upper bead of the tire is seated on a lip on the lower edge of the shoes and is positioned properly horizontally. If the tire does not seat properly on the lip it may not be in proper position for loading. Moreover, with the advent of radial tires, it becomes very important that the tire be very accurately located at the center of the mold cavity. Many currently employed loaders are quite complex and require time consuming shimming operations properly to center the loader shoes over the mold cavity. Such shimming operations increase tire press down time resulting in lower productivity. Moreover, many such loaders are quite complex and take up a substantial amount of vertical space which can create clearance problems as well as service problems. Further, with many complex parts subject to wear, loaders may require frequent part replacements or further shimming operations to compensate for such wear.

Some prior art loaders employ a horizontally disposed oscillating actuating plate which may be in the form of a scroll cam plate. Examples of such mechanisms may be seen in Soderquist U.S. Pat. No. 3,380,115 and Soderquist U.S. Pat. No. 3,564,649. Many other prior art loaders employ vertically oriented actuators as seen in Soderquist U.S. Pat. No. 3,167,810. Other loaders such as shown in Schatz et al U.S. Pat. No. 3,845,979 employ a piston-cylinder actuator for each loader shoe.

In connection with tire press loaders which employ a horizontally disposed cam or scroll plate, wherein a follower rides in a cam slot, there is an inherent clearance between the slot and follower which reduces the precision of centering obtainable in addition to creating other obvious problems such as initial cost and wear.

It is accordingly a principal object of the present invention to provide a tire loader which will not distort the bead of the tire when the loader is engaged therewith.

Another principal object is the provision of a tire loader which permits the green tire to be very accurately located at the center of a mold cavity of a tire press.

Another important object is the provision of a tire loader which can be centered or adjusted in a minimum amount of time reducing loader alignment down time and resulting in higher productivity for the press.

Another significant object is the provision of a lower cost loader having fewer parts subject to wear and replacement, most of which are common.

In addition to the above objects, further objects and advantages of the present invention are its weight, requiring less energy consumption, its ease of serviceability, as well as adjustability, including both centering and stroke limit adjustability as well as vertical height adjustment. In addition, the loader is less subject to wear and has greater repeatable reliability.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a top plan view of one form of loader in accordance with the present invention;

FIG. 2 is a side elevation partially broken away and in section taken substantially from the line 2—2 of FIG. 1;

FIG. 3 is a vertical section, again partially broken away, taken from the line 3—3 of FIG. 1 and illustrating the support for the loader and the vertical adjustment between the support and the loader; and FIG. 4 is an enlarged vertical section taken substantially on the line 4—4 of FIG. 3.

Referring first to FIGS. 1-3 it will be seen that the embodiment of the invention illustrated comprises a vertically extending pin 10 to which is secured horizontally extending support plate 11, the profile configuration of which is seen in FIG. 1. The plate includes two angularly related arms 12 and 13, the latter being somewhat longer. The underside of the plate includes a vertically projecting hub 14 which is keyed to the pin 10 as indicated at 15. The plate is held in place on the pin by a snap ring or retainer 16.

The lower end of the pin 10 has secured thereto a flange forming ring 18, the lower surface of which is beneath the lower end 19 of the pin. Secured to the underside of the ring flange 18 by the fasteners 20 are six equally circumferentially spaced radially extending horizontal slide bars 21. The slide bars are pointed at their inner ends as seen in FIG. 1 to fit together in the manner indicated.

Between the hub 14 of the support plate 11 and the bottom ring flange 18 on the pin is provided with a vertically elongated sleeve 23 journaled top and bottom on the pin 10 as indicated at 24 and 25, respectively. Secured to the sleeve near the lower end thereof is a circular plate 27. Near the upper end, the sleeve is provided with two diametrically opposed projecting arms 28 and 29 which are the same length as the radius of the plate 27.

The sleeve is oscillated by means of piston cylinder assembly 31, the rod 32 thereof being provided with a clevis 33 pivotally connected at 34 to the projecting arm 28. The blind end of the piston cylinder assembly is pivotally supported on stub bracket 35 secured at 36 to the end of arm 13 of the support plate 11.

The stroke of the piston cylinder assembly is limited at both ends by the stroke limiting assembly generally shown at 40. Such assembly comprises a threaded stroke limiter rod 41 pivotally connected at 42 to the arm 29. Such rod 41 may extend through a spherical guide bushing or aperture 43 in stop bracket 44 secured to the underside of the plate 11. Adjustable stroke limiting lock nuts are provided on the threaded limiter rod as indicated at 46 and 47 on each side of the stop block. In the illustrated position, the stop 46 is in engagement with the stop block 44 and the extended condition of the piston cylinder assembly 31 is thus limited. Conversely, when the stop 47 is in engagement with the opposite face of the stop 44, the piston cylinder assembly 31 is limited in its retraction.

For each slide bar 21 there is provided a loader shoe 50, each of which is identical in form and accordingly only one will be described in detail. Each loader shoe 50 is formed from relatively thin gauge metal, almost sheet metal. Each shoe includes a vertically extending spine plate which is slightly curved as seen at 51. Such plate has an aperture 52 therein near its top to accommodate a slide bar 21. Adjacent its bottom it is bent outwardly slightly as indicated at 53 to form a lip 54 adapted to engage the upper bead 55 of the tire 56. It will be appreciated that while the tire 56 is illustrated as a non-belted or bias ply tire, the loader can in equal fashion accommodate belted or radial ply tires as well as cured tires. The curvature of the spine plate 53 is determined by the range of tire sizes which may be accommodated by the loader.

Slightly less than half the distance from the bottom, the edges of the spine plate are folded rearwardly to form parallel plates or ears 59 and 60 each of which has the arcuate lower edges seen at 61.

Such parallel plates are interconnected by a bridge plate 63 which extends slightly above the top edges 64. As seen, the bridge block is sufficiently shallow so as to clear the slide bar 21 which passes therebeneath. Each bridge plate may have two or more radially spaced tapped apertures as indicated at 65.

In addition, the parallel plates 59 and 60 are interconnected by four nut and bolt fasteners 66, 67, 68 and 69. As seen more clearly in FIG. 4, the shanks of the bolts are substantially elongated and each passes through compression sleeves or spacers seen at 72 and 73. Such spacers also fit within semicircular grooves in the backs of self-aligning slide blocks seen at 75, 76, 77, and 78 for each loader shoe. As seen at 80 in FIG. 4, each of the self-aligning slide blocks includes a shallow groove confining the slide bar 21. Preferably the slide blocks are an elastomeric material such as a phenolic resin or nylon having lubricating properties. It can thus be seen that the fasteners 66, 67, 68 and 69 together with the spacers not only maintain the plates 59 and 60 parallel and rigidly connected together, but they also hold the slide blocks in place and of course permit their ready removal and replacement.

Each loader shoe is connected to the circular plate 27 by a connecting rod 82. Each connecting rod includes at each end eyes 83 and 84 threadedly connected to the shank 85 which are in turn hingedly connected at 86 and 87 to the top of the bridge plate 63 and the top or bottom of the plate 27, respectively. The effective length of each rod 82 may of course be adjusted by rotating the shank 85 with respect to the eyes 83 and 84, when the respective lock nuts shown at 88 and 89 are loosened. The range of movement may be selected by selecting one of the apertures 65 for the hinge connection 86.

It can now be seen that rotation of the plate 27 will move the loader shoes 50 uniformly radially along the slide bars 21. In FIG. 1 the shoes are illustrated at their maximum diameter. Upon retraction of the piston cylinder assembly 31 the plate 27 will rotate in a counterclockwise direction as seen in FIG. 1 moving the connecting links uniformly at a common angle with respect to a radius from the pin 10 to achieve the phantom line position 90 seen in FIG. 1 when the shoes achieve the position 91 seen in FIG. 3. In this manner each link extends at a common angle with respect to a radius so that rotation of the sleeve 23 and thus the plate 27 in one direction will reduce the angle moving the shoes radially outwardly and rotation of the sleeve and accordingly the plate 27 in the opposite direction will increase the angle moving the shoes radially uniformly inwardly. It is noted that the radial outer ends of the slide bars 21 are feathered slightly as indicated at 95 readily to permit the loader shoes to be removed and repositioned thereon.

As seen more clearly in FIG. 3, the pin 10 may include an upper threaded removable part 96 which is threaded into a tapped aperture in the pin 10 as seen at 97 and held in place by locking pin 98. The threaded extension 96 of the pin 10 may be employed vertically adjustably to support the loader on horizontal elevator frame member 99. Vertical adjustment and locking is obtained by top and bottom lock nuts 100 and 101 and respective washers 102 and 103. The top nut may be shouldered to fit in a countersunk opening in the top of frame 99 for precision centering. Thus the entire vertical height of the loader with respect to the elevator frame 99 may readily be vertically adjusted. The elevator frame may be of the type wherein a horizontal frame extends between two vertical rails mounted on the press head for vertical and horizontal movement therewith. Conversely, the frame 99 may be of the swinging jib arm type and in any event will normally move vertically and horizontally to pick up and reposition the tire as required.

A limit switch, not shown, may be mounted on the plate 11 which may include a feeler arm which may project below the plate to sense the position of the loader with respect to a tire to be picked up. Such limit switch and sensing arm may be mounted on the extension 12 of the plate 11 as seen in FIG. 1. The sensor may also be employed to sense the position of the loader with respect to an object adjacent the deposit location of the tire such as a center mechanism of a tire press.

While there is illustrated the employment of six shoes, it will be appreciated that more or less, but more than two, may equally well be employed.

In any event there is provided an inexpensive, easy to operate and maintain loader for tires which can readily be centered and which will minimize bead distortion.

Other modes of applying the principle of the invention may be employed, change being made as regards the details described, provided the features stated in any of the following claims or the equivalent of such be employed.

I, therefore, particularly point out and distinctly claim as my invention:

1. A tire loader comprising a movable frame, a horizontal plate mounted for rotation on a vertical axis, loader shoes mounted on said frame for radial movement to and from said axis, respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, said link means comprising adjustable length connecting rods hingedly connected to said plate and the respective shoes, a piston-cylinder assembly operative to rotate said plate in said one and opposite directions, and an adjustable stop limiting the rotation of said plate in said one direction and thus the movement of said shoes radially outwardly.

2. A tire loader comprising a movable frame, a horizontal plate mounted for rotation on a vertical axis, loader shoes mounted on said frame for radial movement to and from said axis, respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, said plate being journaled on a vertically extending non-rotatable pin, radially extending slide bars secured to the bottom of said pin, one for each loader shoe, and means mounting each loader shoe for sliding movement on its respective slide bar, each loader shoe being supported on its respective slide bar by horizontally spaced pairs of slide blocks of elastomeric material, each block being in sliding frictional engagement with the slide bar, each loader shoe including two parallel ears, and fasteners interconnecting said ears, each fastener extending through a sleeve spacing said ears.

3. A loader as set forth in claim 2 including four such fasteners and sleeves, each sleeve fitting in a semi-circular groove in the back of a slide block.

4. A loader as set forth in claim 2 including a bridge plate extending between said ears, said respective link means being hingedly connected thereto at alternative locations thereon.

5. A tire loader comprising a movable frame, a horizontal plate mounted for rotation on a vertical axis, loader shoes mounted on said frame for radial movement to and from said axis, respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, said plate being journaled on a vertically extending non-rotatable pin, radially extending slide bars secured to the bottom of said pin, one for each loader shoe, means mounting each loader shoe for sliding movement on its respective slide bar, said plate including a hub journaled on said pin and an arm projecting from said hub, said arm being pivotally connected to the rod of a piston-cylinder assembly, a second arm projecting from said hub, a stop rod pivotally connected to said second arm, a fixed stop block through which said stop rod slidably moves, and adjustable stops on said stop rod on opposite sides of said stop block operative to limit rotation of said plate in said one and opposite directions.

6. A tire loader comprising a movable frame, a horizontal plate mounted for rotation on a vertical axis, loader shoes mounted on said frame for radial movement to and from said axis and respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, a piston-cylinder assembly operative to rotate said plate in said one and opposite directions, said piston-cylinder assembly being pivotally connected at one end to said movable frame, and an adjustable stop limiting the rotation of said plate in said one direction and thus the movement of said shoes radially outwardly.

7. A tire loader comprising a movable frame, a horizontal plate mounted for rotation on a vertical axis, loader shoes mounted on said frame for radial movement to and from a common center, and respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, said link means including adjustable length connecting rods hingedly connected to said plate and the respective shoes, said connecting rods being independently and substantially continuously adjustable in length through a selected range.

8. A loader as set forth in claim 7 including a piston-cylinder assembly operative to rotate said plate in said one and opposite directions.

9. A loader as set forth in claim 7 wherein said plate is journaled on a vertically extending non-rotatable pin, radially extending slide bars secured to the bottom of said pin, one for each loader shoe, and means mounting each loader shoe for sliding movement on its respective slide bar.

10. A loader as set forth in claim 9 wherein each loader shoe is supported on its respective slide bar by horizontally spaced pairs of slide blocks of elastomeric material, each block being in sliding frictional engagement with the slide bar.

11. A loader as set forth in claim 9 wherein said plate includes a hub journaled on said pin and an arm projecting from said hub, said arm being pivotally connected to the rod of a piston-cylinder assembly.

12. A loader as set forth in claim 9 wherein said pin includes a vertical extension, and means vertically adjustable to connect said extension to said movable frame.

13. A loader as set forth in claim 12 wherein said extension is threaded and passes through said movable frame, and clamp nuts on said extension adjustably clamping said extension to said movable frame.

14. A tire loader comprising a vertically and horizontally movable support, a frame secured to said support, a set of loader shoes mounted on said frame for radial movement to and from a common center axis, a rotatable plate, and adjustable length link means interconnecting each shoe and said plate whereby rotation of said plate about a vertical axis will move said shoes radially, said link means being independently and substantially continuously adjustable in length through a selected range.

15. A loader as set forth in claim 14 wherein said loader shoes are slidably mounted on radially extending slide bars and remain parallel to a vertical line extending through such common center at all times.

16. A loader as set forth in claim 15 including self-aligning friction slide blocks supporting each shoe for radial movement.

17. A tire loader comprising a movable frame, a horizontal plate mounted for rotation on a vertical axis, loader shoes mounted on said frame for radial movement to and from said axis, respective link means interconnecting said plate and each shoe, each link means extending at a common angle with respect to a radius whereby rotation of said plate in one direction will reduce said angle thus moving said shoes radially outwardly and rotation of said plate in the opposite direction will increase said angle thus moving said shoes radially inwardly, a piston-cylinder assembly operative to rotate said plate in said one and opposite directions, said piston-cylinder assembly being pivotally connected at one end to said movable frame, and an adjustable stop limiting the rotation of said plate in said one direction and thus the movement of said shoes radially outwardly.

* * * * *